United States Patent
Stigsen

(10) Patent No.: US 11,294,935 B2
(45) Date of Patent: Apr. 5, 2022

(54) CONFLICT RESOLUTION IN DISTRIBUTED COMPUTING

(71) Applicant: MongoDB, Inc., New York, NY (US)

(72) Inventor: Alexander Stigsen, Allerød (DK)

(73) Assignee: MongoDB, Inc., New York, NY (US)

( * ) Notice: Subject to any disclaimer, the term of this patent is extended or adjusted under 35 U.S.C. 154(b) by 346 days.

(21) Appl. No.: 16/412,264

(22) Filed: May 14, 2019

(65) Prior Publication Data
US 2019/0354540 A1    Nov. 21, 2019

Related U.S. Application Data

(60) Provisional application No. 62/671,931, filed on May 15, 2018.

(51) Int. Cl.
| | | |
|---|---|---|
| G06F 17/00 | (2019.01) | |
| G06F 7/00 | (2006.01) | |
| G06F 16/27 | (2019.01) | |
| G06F 7/14 | (2006.01) | |

(52) U.S. Cl.
CPC .............. *G06F 16/275* (2019.01); *G06F 7/14* (2013.01)

(58) Field of Classification Search
CPC ................................ G06F 16/275; G06F 7/14
USPC .......................................................... 707/611
See application file for complete search history.

(56) References Cited

U.S. PATENT DOCUMENTS

| | | | | |
|---|---|---|---|---|
| 6,122,640 | A | 9/2000 | Pereira | |
| 6,678,882 | B1 * | 1/2004 | Hurley | G06F 8/315 717/121 |
| 7,603,357 | B1 * | 10/2009 | Gourdol | G06F 16/1774 707/999.001 |
| 8,072,950 | B2 * | 12/2011 | Fan | H04W 88/02 370/338 |
| 8,352,870 | B2 * | 1/2013 | Bailor | G06F 16/954 715/751 |
| 9,251,235 | B1 * | 2/2016 | Hurst | G06F 16/275 |
| 9,298,792 | B2 * | 3/2016 | Ylinen | G06F 16/273 |
| 9,448,789 | B2 * | 9/2016 | Mathur | G06F 8/70 |
| 9,529,731 | B1 | 12/2016 | Wallace et al. | |
| 9,552,407 | B1 * | 1/2017 | Hurst | G06F 16/275 |
| 10,956,446 | B1 * | 3/2021 | Hurst | G06F 16/275 |
| 2002/0023113 | A1 | 2/2002 | Hsing et al. | |

(Continued)

OTHER PUBLICATIONS

International Preliminary Report on Patentability dated Nov. 26, 2020 in connection with International Application No. PCT/US2019/032483.

(Continued)

*Primary Examiner* — Pavan Mamillapalli
(74) *Attorney, Agent, or Firm* — Wolf, Greenfield & Sacks, P.C.

(57) ABSTRACT

Disclosed is a system and method for resolving conflicts that arise in changes made to data by multiple client devices. A data manipulation operation is represented as a changeset, which has instructions for performing an operation on the data. When two client devices perform operations that change the state of a data object, a changeset is generated at each of the two client devices. These changesets are merged at each of the two client devices based on merging rules that resolve any conflict between the operations. The rules ensure that the data at each of the multiple client devices will eventually be consistent.

24 Claims, 10 Drawing Sheets

(56) References Cited

U.S. PATENT DOCUMENTS

| | | |
|---|---|---|
| 2002/0099728 A1 | 7/2002 | Lees et al. |
| 2003/0028683 A1 | 2/2003 | Yorke et al. |
| 2004/0148316 A1 | 7/2004 | Bridge, Jr. et al. |
| 2005/0071195 A1* | 3/2005 | Cassel ............... G16H 10/60 705/2 |
| 2006/0020570 A1 | 1/2006 | Wu |
| 2008/0027996 A1 | 1/2008 | Morris |
| 2009/0210459 A1* | 8/2009 | Nair ................ G06F 16/954 707/999.203 |
| 2009/0271696 A1* | 10/2009 | Bailor ............... G06F 16/954 715/229 |
| 2012/0166400 A1 | 6/2012 | Sinclair et al. |
| 2016/0342335 A1 | 11/2016 | Dey et al. |
| 2017/0075949 A1 | 3/2017 | Stefani et al. |

OTHER PUBLICATIONS

PCT/US2019/032483, Jul. 24, 2019, International Search Report and Written Opinion.

International Search Report and Written Opinion date Jul. 24, 2019 in connection with International Application No. PCT/US2019/032483.

PCT/US2019/032483, Nov. 26, 2020, International Preliminary Report on Patentability.

\* cited by examiner though the data is shared among multiple computing devices, each computing device may have a copy of the shared data. The rules ensure that data at each of the multiple computing devices will eventually be consistent.

CONFLICT RESOLUTION IN DISTRIBUTED COMPUTING

CROSS-REFERENCE TO RELATED APPLICATION(S)

This application claims the benefit of U.S. Provisional Application Ser. No. 62/671,931 titled "METHOD AND APPARATUS FOR CONFLICT RESOLUTION" filed May 15, 2018, which is incorporated herein by reference for all purposes in its entirety.

BACKGROUND

One of the defining features of mobile devices is the fact that one can never count on being online. Loss of connectivity is a fact of life, and so are slow networks and choppy connections. But people still expect their apps to work. This means that there may be two or more users making changes to the same piece of data independently, thus creating conflicts. This can happen even with perfect connectivity because the latency of communicating between the mobile device and the server may be slow enough that two or more mobile devices can end up creating conflicting changes at the same time.

SUMMARY

Embodiments are directed to resolving conflicts that arise in changes made to data by multiple computing devices. The embodiments resolve a data conflict through the application of rules to the data manipulation operations performed by the computing devices. In some embodiments, although the data is shared among multiple computing devices, each computing device may have a copy of the shared data. The rules ensure that data at each of the multiple computing devices will eventually be consistent.

When changes are made to a data object, e.g., by a user associated with a computing device, the computing device generates changesets corresponding to the data manipulation operations. In some embodiments, a changeset contains instructions corresponding to a data manipulation operation performed on a data object. Each of the computing devices can generate their own changesets representing data manipulation operations performed on the data object at the respective computing devices. The data is synchronized by exchanging these changesets between the computing devices and merging the changesets on each of the computing devices. A conflict can arise when two changesets are merged on a computing device. The embodiments can resolve the conflict by merging the two changesets based on a set of merging rules. The merging rules are defined as a function of the type of data manipulation operations in each of the two changesets and a timestamp associated with each of the two changesets. For example, if a first changeset, which is generated at a first computing device, represents a delete operation on a data object at the first computing device and a second changeset, which is generated at a second computing device, represents an updating a value of an attribute of the data object at the second computing device, the delete operations emerges as a winner in the conflict and the update operation is discarded as part of the merge operation. The merge operation is executed at both the devices. In another example, if the first changeset represents a "set" operation that sets an attribute of the data object to a first value and the second changeset also represents a "set" operation that sets an attribute of the data object to a second value, the operation that has a later timestamp emerges as a winner in the merge operation.

Each of the computing devices upload their changesets to a server computing device ("server"), which stores changesets in the order they are received. Whenever a computing device synchronizes with the server, the computing device can download the changesets of other computing devices from the server and execute the merge operations on the downloaded changesets.

DETAILED DESCRIPTION

Figure 1:
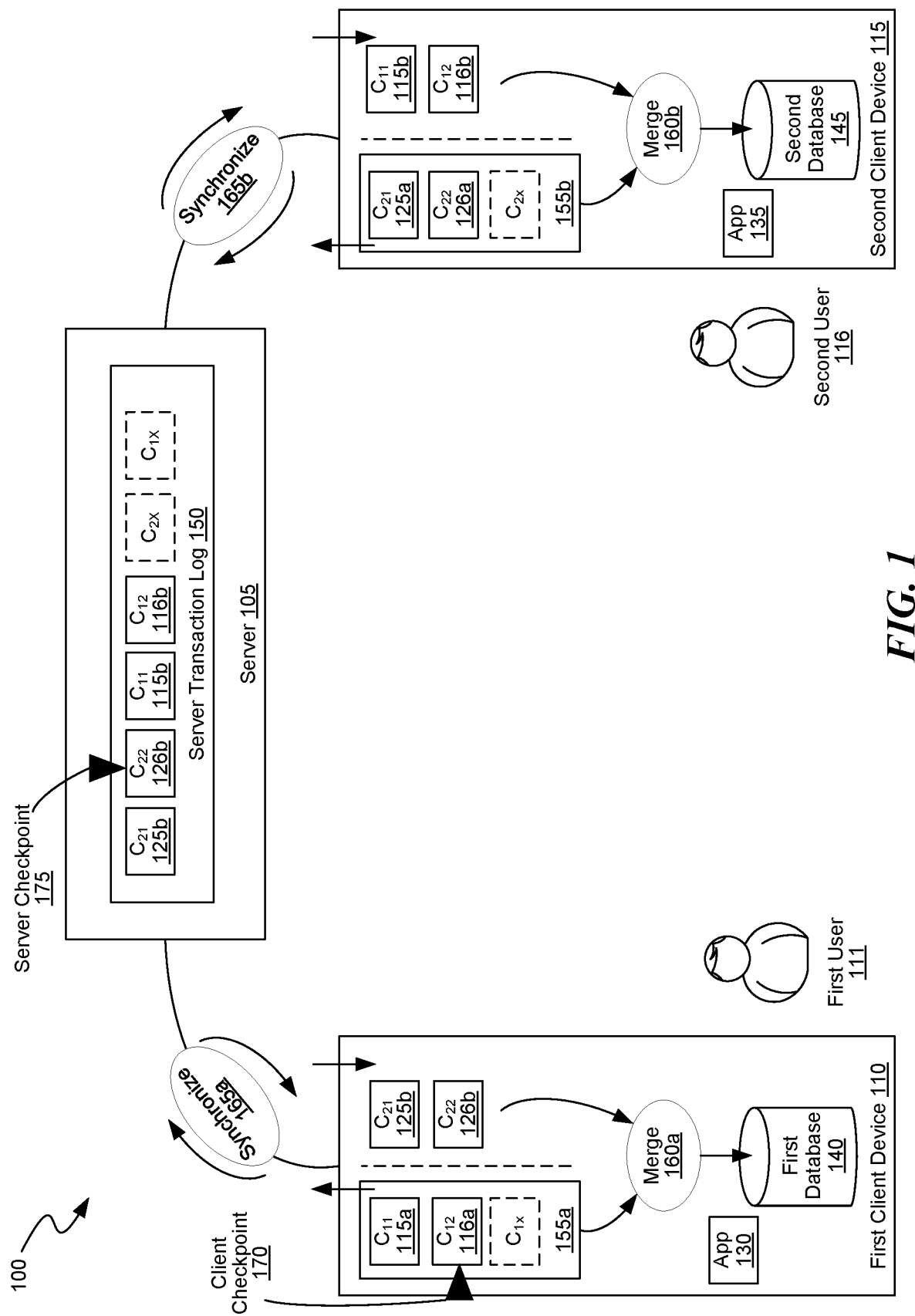
FIG. 1 is a block diagram of an environment in which the disclosed embodiments can be implemented.

FIG. 1 is a block diagram of an environment 100 in which the disclosed embodiments can be implemented. The environment 100 includes multiple client devices such as a first client device 110 and a second client device 115. The client devices can execute one or more applications, which can access data stored in their corresponding databases. For example, a first app 130 executing at the first client device 110 can access a first database 140, and a second app 135 executing at the second client device 115 can access a second database 145. In some embodiments, at least a portion of the data stored in the first and second databases is shared between the client devices. That is, each of the client devices can access, e.g., read and/or write, the shared data and any changes made to the shared data will be applied to the data in all the client devices. A client device can be any network accessible computing device such as a desktop, a laptop, a smartphone, a tablet PC, or a wearable device. Each of the first app 130 and the second app 135 can be a mobile app or a browser-based application.

The client devices can perform data manipulation operations ("operations") on a data object stored in a database to make changes to the data object and each of the operations is represented as a changeset, which contains instructions regarding the operation to be performed on the data object. Examples of an operation that a changeset can represent include, but is not limited to, "set property," "set default value," "set integer," "add integer," "set string," "substring insert," "substring delete," "set primary key," "link list insert," "delete object," and "clear table." In some embodiments, the set property operation sets an attribute or property of a data object to a specified value. In some embodiments, the set default value operation sets a default value of an attribute of a data object to a specified value. In some embodiments, the set integer operation sets an integer attribute of a data object to a specified integer value. In some embodiments, the add integer operation adds an integer value to a value of an integer attribute of a data object. In some embodiments, the set string operation sets a string attribute of a data object to a specified string value. In some embodiments, the substring insert operation adds a string to a string value of an attribute of a data object. In some embodiments, the substring delete operation deletes a portion of a string value of an attribute of a data object. In some embodiments, the set primary key operation sets a specified value of an attribute of a data object as a primary key, which causes the specified value to be unique across all data objects. In some embodiments, the link list insert operation inserts a list item to a linked list data object having one or more list items. In some embodiments, the delete object operation deletes a data object from the database. In some embodiments, the clear table operation clears the contents of a table data object.

Whenever changes are made to the data at a client device, the client device can generate a changeset. For example, when the first client device 110 performs a first operation, such as setting a default value of an attribute of a data object stored in the first database 140, the first client device 110 generates a first changeset $C_{11}$ 115a having instructions for performing the set default value operation. Similarly, a second changeset $C_{12}$ 116a can correspond to a second operation performed by the first client device 110 to update the data object. The second client device 115 can also, similarly, generate a third changeset $C_{21}$ 125a, which can correspond to a third operation performed by the second client device 115 to update a data object stored in the second database 145, and a fourth changeset $C_{22}$ 126a, which can correspond to a fourth operation performed by the second client device 115 to update the data object in the second database 145. Note that the operations at the first client device 110 and the second client device 115 can occur independent of the operations at the other client device. In some embodiments, the changesets at a client device are stored in a client transaction log 155. For example, the first changeset $C_{11}$ 115a and the second changeset $C_{12}$ 116a are stored in a client transaction log 155a at the first client device 110.

The changesets from each of the client devices are uploaded to a server 105, which facilitates data synchronization between the client devices. For example, the first client device 110 can upload the first changeset $C_{11}$ 115a and the second changeset $C_{12}$ 116a to the server 105, which are stored as a first changeset $C_{11}$ 115b and a second changeset $C_{12}$ 116b, respectively. Similarly, the second client device 115 can upload the third changeset $C_{21}$ 125a and the fourth changeset $C_{22}$ 126a, to the server 105, which are stored as a third changeset $C_{21}$ 125b and a fourth changeset $C_{22}$ 126b, respectively. The server 105 stores the changesets in a server transaction log 150. In some embodiments, the server 105 adds the changesets to the server transaction log 150 in the order they are received from the client devices, which can be different from, or the same as, the order in which they were generated at the corresponding client devices.

As part of synchronization process 165, a client device can upload its changesets, if any, to the server 105, and download changesets, if any, of other client devices from the server 105 and apply them to its database. For example, as part of the synchronization process 165a, the first client device 110 can synchronize the first database 140 with other client devices, such as the second client device 115, by downloading the third changeset $C_{21}$ 125b and the fourth changeset $C_{22}$ 126b from to the server 105 and applying them to the first database 140. The first client device can also upload any changesets, such as the first changeset $C_{11}$ 115a and the second changeset $C_{12}$ 116a, that are not yet uploaded to the server 105, as part of the synchronization process 165a.

After downloading the third changeset $C_{21}$ 125b and the fourth changeset $C_{22}$ 126b from to the server 105, the first client device 110 can apply them to the first database 140 to update the changes. Since changes have been made to the first database 140 locally too, e.g., via the first changeset $C_{11}$ 115a and the second changeset $C_{12}$ 116a, the changes made by the remote device, such as the second client device 115, can potentially conflict with the local changes. If the local changes and the remote changes are causally related or for different portions of the data, there may not be a conflict, and the remote changes can be applied to the first database 140 without any worries about the conflict. However, if the local changes and the remote changes are not causally related, or for the same portion of the data, e.g., for the same data object, there can be a conflict in applying the remote changes. The synchronization process 165 can resolve such a conflict by using a merge operation 160, which merges the local changesets with the remote changesets based on the application of merging rules.

The merging rules determine which of the changesets, e.g., a local changeset, a remote changeset, or both have to applied to the first database 140. The merging rules are defined based on at least one of a type of the operation or a timestamp associated with each of the changesets. For example, to merge the remote changesets, such as the third changeset $C_{21}$ 125b and the fourth changeset $C_{22}$ 126b, with the local changesets, such as the first changeset $C_{11}$ 115a and the second changeset $C_{12}$ 116a, the first client device 110 determines the type of operation in each of the changesets and/or the timestamp associated with each of the changesets and then determines the changesets that have to be applied to the first database 140, details of which are described at least with reference to FIGS. 2A-2D below.

The second client device 115 can also similarly merge the local changes, such as the third changeset $C_{21}$ 125a and the fourth changeset $C_{22}$ 126a, with the remote changesets, such as first changeset $C_{11}$ 115b and the second changeset $C_{12}$ 116b, as described above with respect to the first client device 110.

Whenever a changeset is uploaded to or downloaded from the server 105, e.g., as part of a synchronization request, the synchronization process 165 ensures that only the unsynchronized changesets, such as those that were not yet uploaded or downloaded as part of a prior synchronization request, are uploaded or downloaded. In some embodiments, the synchronization process uses checkpoints to achieve the above result. For example, after downloading the fourth changeset 126b from the server 105 and applying all the downloaded changesets to the first database 140, the synchronization process 165a can insert a server checkpoint 175 in the server transaction log 150 pointing to the fourth changeset 126b. In some embodiments, the server checkpoint 175 indicates that all changesets of other client devices added to the server transaction log 150 up to the server checkpoint 175 have been synchronized (e.g., downloaded and applied to the first database 140) by the first client device 110. When the first client device 110 synchronizes with the server 105 next, the synchronization process 165a ensures that only those changesets (e.g., changeset $C_{2X}$) that are added to the server transaction log 150 after the server checkpoint 175 is added are downloaded to the first client device 110. Similarly, the first client device 110 can also add a client checkpoint 170 in the client transaction log 155 to indicate that all changesets in the client transaction log 155 up until the client checkpoint 170 are uploaded to the server 105. When the first client device 110 synchronizes with the server 105 next, the synchronization process 165a ensures that only those changesets (e.g., changeset $C_{1X}$) that are added to the client transaction log 155 after the client checkpoint 170 is inserted are uploaded to the server 105.

The second client device 115 can also have its own pair of server and client checkpoints to ensure that only unsynchronized changesets are synchronized by the second client device 115, as describe above with respect to the first client device 110. Further, in some embodiments, the client devices can assign version numbers (e.g., client version number and server version number) to the changesets instead of inserting checkpoints to ensure that only unsynchronized changesets are synchronized.

Figure 2A:
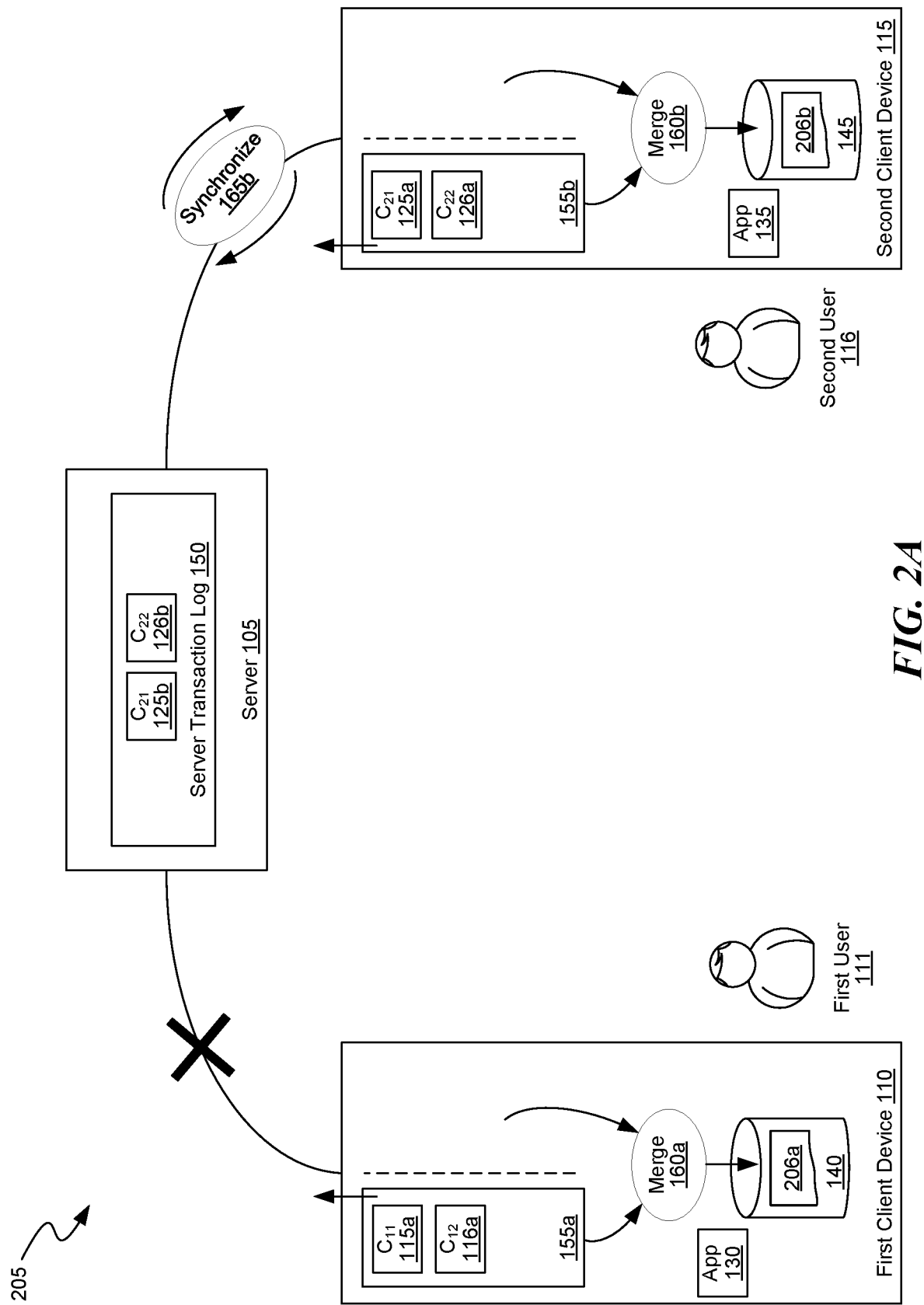
FIG. 2A is a block diagram of an example for merging local changesets with remote changesets at a first client device, consistent with various embodiments.

FIG. 2A is a block diagram of an example 205 for merging local changesets with remote changesets at the first client device 110, consistent with various embodiments. In the example 205, a data object 206 is shared between the first client device 110 and the second client device 115. Each client device has a copy of the data object 206 in their corresponding database. For example, the first client device 110 stores a data object 206a, which is a copy of the data object 206, in the first database 140 and the second client device 115 stores a data object 206b, which is another copy of the data object 206, in the second database 145. Any changes made to the data object 206a may have to be applied to the data object 206b, or vice versa.

In the example 205, the first client device 110 is offline, that is, the first client device 110 is not connected to the server 105. Since the first client device 110 is offline, the local changesets, such as the first changeset $C_{11}$ 115a and the second changeset $C_{12}$ 116a, corresponding to local changes made to the data object 206a, e.g., by a first user 111 associated with the first client device 110, are not uploaded to the server 105.

The second client device 115 is online, that is, connected to the server 105 and has uploaded its changesets, such as the third changeset $C_{21}$ 125a and the fourth changeset $C_{22}$ 126a, to the server 105. The third changeset $C_{21}$ 125a and the fourth changeset $C_{22}$ 126a correspond to the changes made to the data object 206b, e.g., by a second user 112 associated with the second client device 115. In some embodiments, the data object 206 is shared between the first client device 110 and the second client device 115. Any changes made to the data object 206a may have to be applied to the data object 206b, or vice versa.

In the example 205, since the first client device 110 is offline, the first client device 110 does not have access to the changesets of the second client device 115, nor does the second client device 115 have access to the changesets of the first client device 110. However, the users 111 and 112 can continue to make changes to the data object 206a and 206b, respectively, and be assured that the data objects 206a and 206b will eventually be consistent, e.g., after both the client devices synchronize with the server 105 to obtain the changesets of the other client device.

Figure 2B:
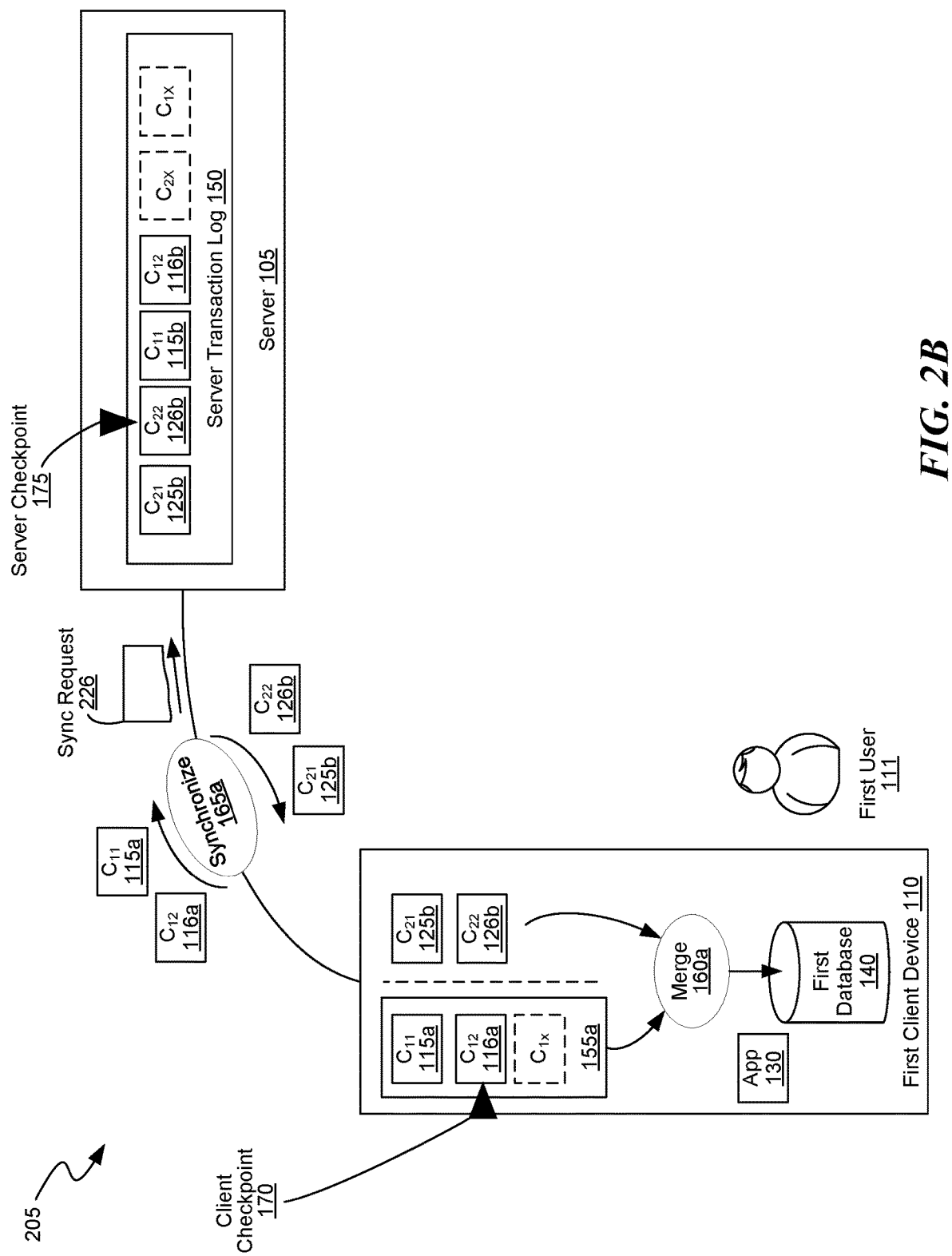
FIG. 2B is a block diagram of another example for merging local changesets with remote changesets at the first client device, consistent with various embodiments.

FIG. 2B is a block diagram of another example 225 for merging local changesets with remote changesets at the first client device 110, consistent with various embodiments. In the example 225, the first client device 110 goes online, and synchronizes with the server 105, e.g., by sending a synchronization request 226 to the server 105. In some embodiments, the synchronization can also be initiated by the server 105. After receiving the synchronization request 226, the server 105 allows the first client device 110 to download the changesets of the second client device 115, such as the third changeset $C_{21}$ 125b and the fourth changeset $C_{22}$ 126b, from the server transaction log 150. In some embodiments, the first client device 110 downloads those changesets that are generated by client devices other than the first client device 110 and that are not already downloaded by the first client device 110, e.g., as part of prior synchronization requests. Further, the first client device 110 can also upload the first changeset 115a and the second changeset 116a to the server 105.

Since the server transaction log 150 of the server 105 has new changesets, e.g., the first changeset 115b and the second changeset 116b of the first client device 110, the second client device 115 can synchronize with the server 105 to download those changesets. The server 105 can notify the second client device 115 of the availability of new changesets or the second client device 115 may periodically check with the server 105 for the new changesets.

Figures 2C, 2D:
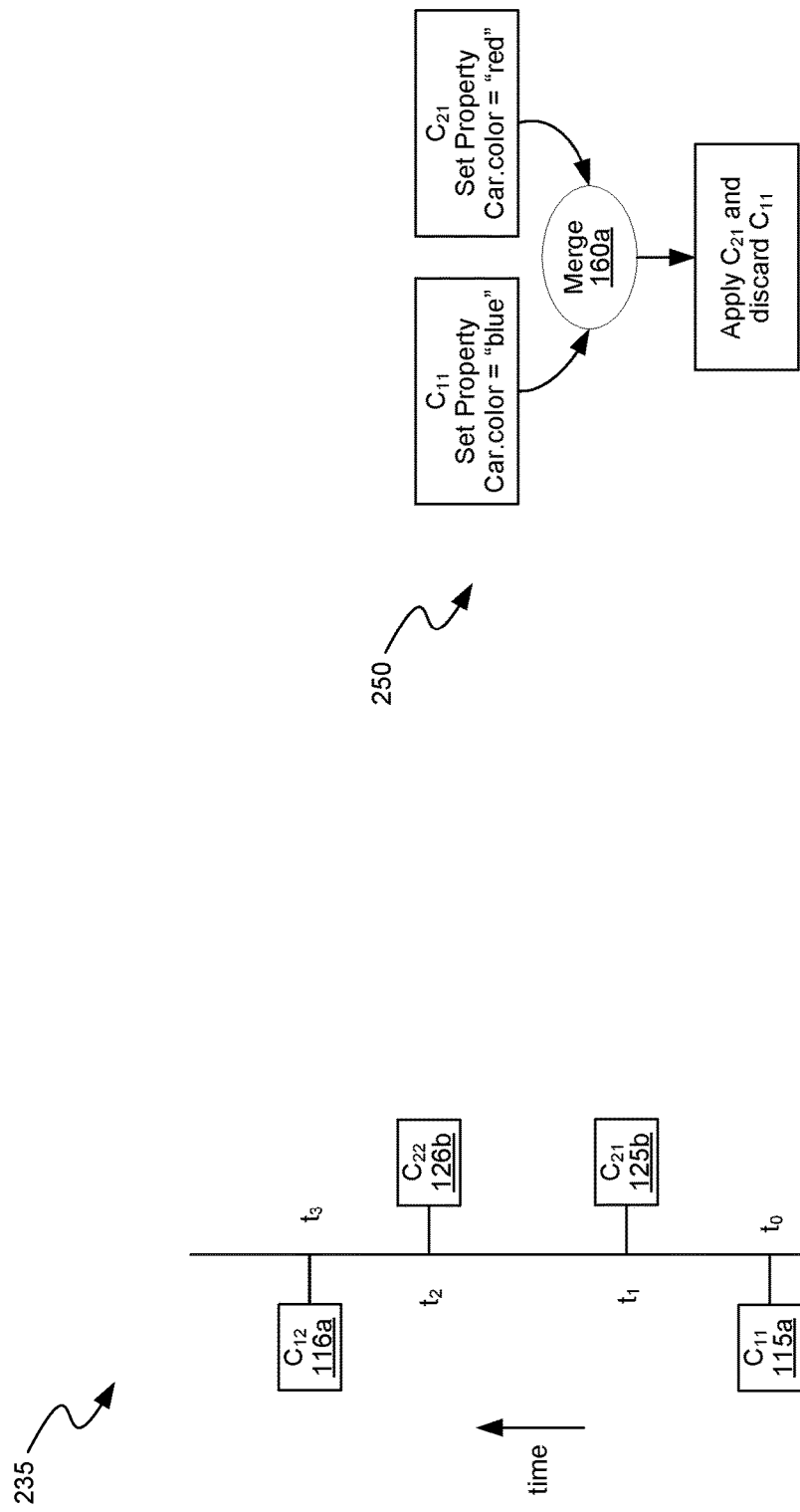
FIG. 2C is an example timeline of changesets, consistent with various embodiments.
FIG. 2D is a block diagram illustrating merging of changesets at the first client device for various types of operations, consistent with various embodiments.
Figure 2D:
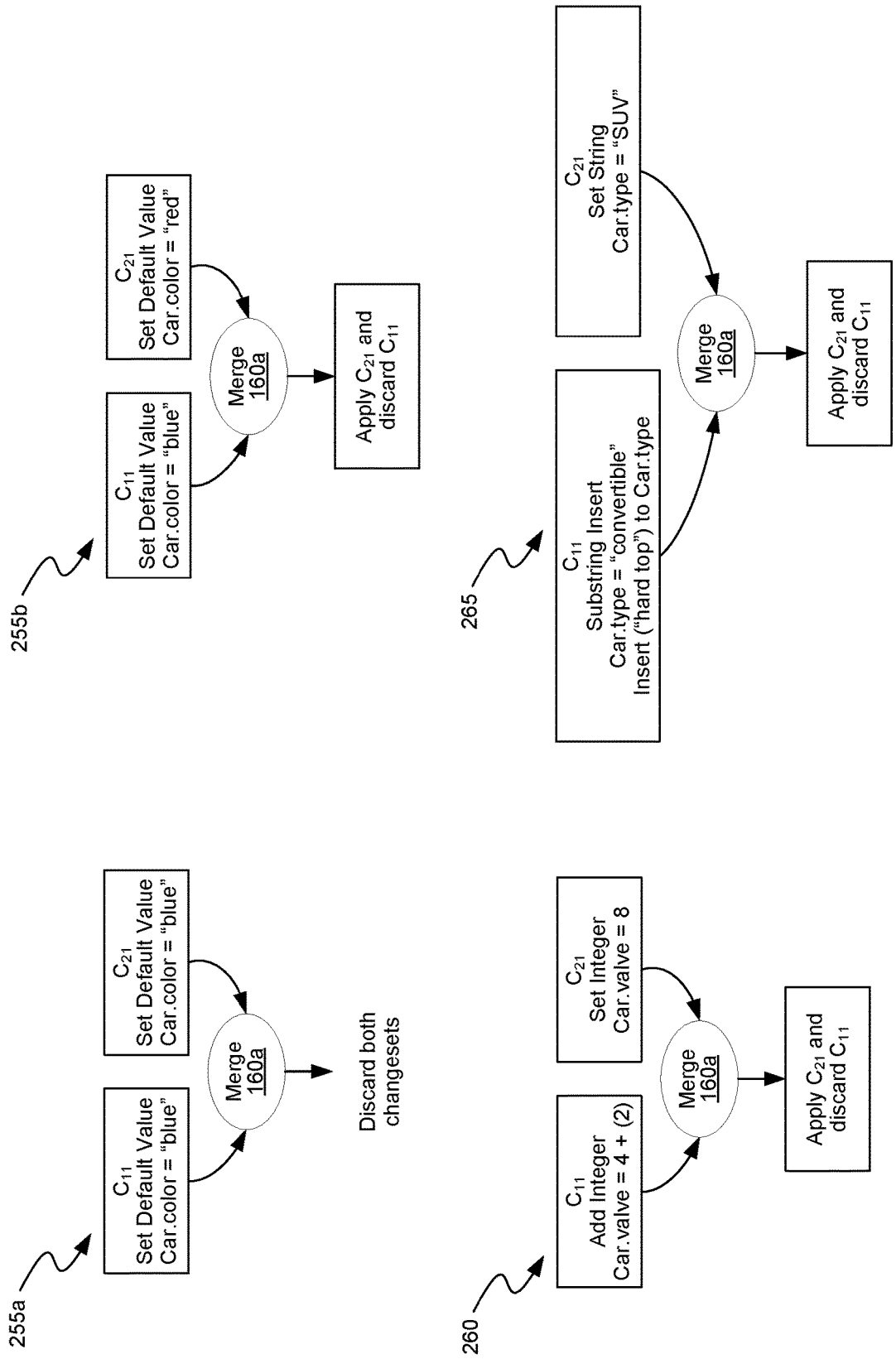
Figure 2D:
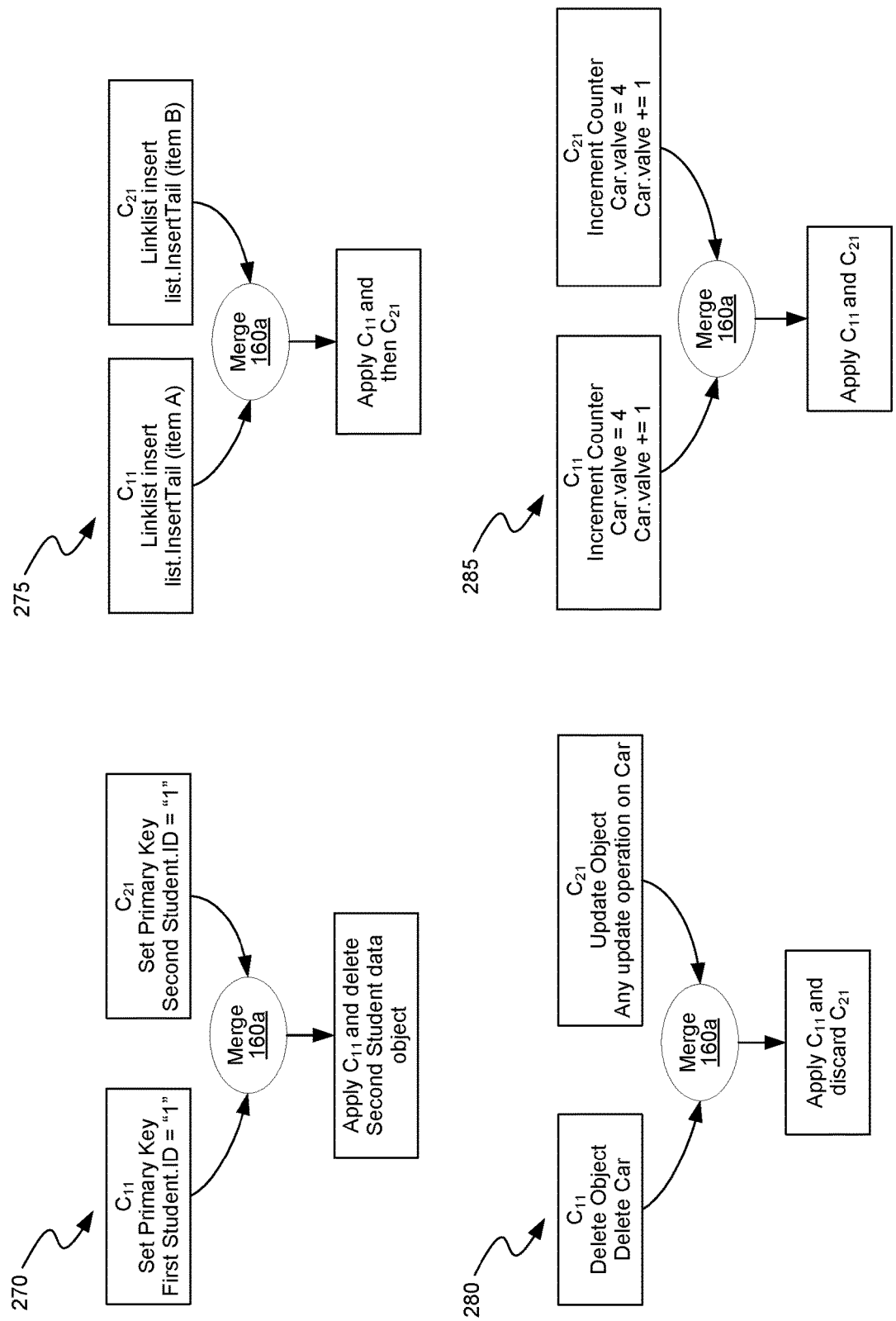

FIG. 2C is an example 235 of a timeline of generation of changesets, consistent with various embodiments. Each changeset is tagged with a timestamp that indicates the time at which the changeset is generated at the corresponding client device. In some embodiments, the timestamp is indicative of the real-world time, as indicated by the internal clock of the client device generating the changeset. In the example 235, the changesets are ordered on a timeline 236 according to a timestamp of the changesets. The timeline 236 indicates that the first changeset $C_{11}$ 115a was generated at the first client device 110 at time $t_0$, the third changeset $C_{21}$ 125b was generated at the second client device 115 at time $t_1$, the fourth changeset $C_{22}$ 126b was generated at the second client device 115 at time $t_2$, and the second changeset $C_{12}$ 116a was generated at the first client device 110 at time $t_3$, where $t_0<t_1<t_2<t_3$. In some embodiments, the merging rules consider the timestamp of a changeset to resolve a conflict, as described with various examples of FIG. 2D below.

FIG. 2D is a block diagram illustrating merging of changesets at the first client device 110 for various types of operations, consistent with various embodiments. As described above, the merging rules considers at least one of a type of the operation or a timestamp associated with each of the changesets to determine one or more operations that wins the conflict and updates the data object based on the winning operation.

In the first example 250, consider that the first changeset $C_{11}$ 115a and the third changeset $C_{21}$ 125b correspond to a "set property" operation on the data object 206a and 206b, respectively, such as setting a color (attribute) of a car (data object). The first changeset $C_{11}$ 115a corresponds to setting the color of the car to "blue," and the third changeset $C_{21}$ 125b corresponds to setting the color of the car to "red." In some embodiments, if both the changesets are of type "set property", then the merging rules define that a changeset having a later timestamp wins and the other changeset is to be discarded. Accordingly, since the timestamp, t1, of the third changeset $C_{21}$ 125b is later than the timestamp, t0 of the first changeset $C_{11}$ 115a (as indicated in the example 235 of FIG. 2C), the first client device 110 determines that the third changeset $C_{21}$ 125b wins, and discards the first changeset $C_{11}$ 115a as a result of the merge operation 160a. Accordingly, the first client device 110 sets the color of the car to "red" by applying the third changeset $C_{21}$ 125b to the data object 206a.

In the second example 255a, consider that the first changeset $C_{11}$ 115a and the third changeset $C_{21}$ 125b correspond to a "set default value" operation on the data object 206a and 206b, respectively, such as setting a default value of a color attribute of a car data object. In some embodiments, if both the changesets are of type "set default value" and the default values are the same, then the merging rules define that the both the changesets are to be discarded. For example, if both the first changeset $C_{11}$ 115a and the third changeset $C_{21}$ 125b correspond to setting the color of the car to "blue," the first client device 110 discards both the changesets as a result of the merge operation 256a and no changes are made to the data object 206a. On the other hand, if the default values of the changesets are different, then the merging rules define that a changeset having a later timestamp wins and the other changeset is to be discarded. For example, if the first changeset $C_{11}$ 115a corresponds to setting default value of the color to "blue," and the third changeset $C_{21}$ 125b to "red," as illustrated in the second example 255b, then the third changeset $C_{21}$ 125b wins, and the first changeset $C_{11}$ 115a is discarded as a result of the merge operation 160a because timestamp, $t_1$, of the third changeset $C_{21}$ 125b is later than the timestamp, to of the first changeset $C_{11}$ 115a (as indicated in the example 235 of FIG. 2C). Accordingly, the first client device 110 sets the default value of the color of the car to "red" by applying the third changeset $C_{21}$ 125b to the data object 206a.

In the third example 260, consider that the first changeset $C_{11}$ 115a corresponds to an "add integer" operation on the data object 206a, such as adding an integer value of "2" to valves attribute of a car data object, which has a value of "4," and that the third changeset $C_{21}$ 125b corresponds to a "set integer" operation on the data object 206b, such as setting an integer value of "8" to the valves attribute of the car data object. In some embodiments, if one changeset corresponds to an "add integer" operation and another corresponds to a "set integer" operation, then the merging rules define that a changeset with the later timestamp wins. Accordingly, since the timestamp, $t_1$, of the third changeset $C_{21}$ 125b is later than the timestamp, to, of the first changeset $C_{11}$ 115a (as indicated in the example 235 of FIG. 2C), the first client device 110 determines that the third changeset $C_{21}$ 125b wins, and discards the first changeset $C_{11}$ 115a as a result of the merge operation 160a. Accordingly, the first client device 110 sets the value of the valves of the car to "8" by applying the third changeset $C_{21}$ 125b to the data object 206a.

In the fourth example 265, consider that the first changeset $C_{11}$ 115a corresponds to an "substring" insert or delete operation on the data object 206a, such as inserting a substring "hard top" to a car type attribute of a car data object, which has a value of "convertible," and that the third changeset $C_{21}$ 125b corresponds to a "set string" operation on the data object 206b, such as setting a string value of "SUV" to the car type attribute of the car data object. In some embodiments, if one changeset corresponds to a substring operation and another corresponds to a "set string" operation, then the merging rules define that a changeset corresponding to the "set string" wins and the changeset corresponding to the substring operation is to be discarded. Accordingly, the first client device 110 determines that the third changeset $C_{21}$ 125b wins, and discards the first changeset $C_{11}$ 115a as a result of the merge operation 160a. Accordingly, the first client device 110 sets the value of the car type of the car to "SUV" by applying the third changeset $C_{21}$ 125b to the data object 206a.

In the fifth example 270, consider that the first changeset $C_{11}$ 115a and the third changeset $C_{21}$ 125b correspond to a "set primary key" operation on the data object 206a and 206b, respectively, such as setting an ID (attribute) of a student (data object) as a primary key. The first changeset $C_{11}$ 115a corresponds to setting the ID having value "1" of a first student data object as a primary key, and the third changeset $C_{21}$ 125b corresponds to setting the ID having value "1" of a second student data object also as the primary key. In some embodiments, if both the changesets are setting the same primary key on two different objects, then the merging rules define that a changeset having an earlier timestamp wins and the other changeset is to be discarded and the data object corresponding to the other changeset is to be deleted. Accordingly, since the timestamp, t0 of the first changeset $C_{11}$ 115a is earlier than the timestamp, t1, of the third changeset $C_{21}$ 125b (as indicated in the example 235 of FIG. 2C), the first client device 110 determines that the first changeset $C_{11}$ 115a wins, and discards the third changeset $C_{21}$ 125b as a result of the merge operation 160a. Accordingly, the first client device 110 sets the ID having value "1" of the first student object as the primary key by applying the first changeset $C_{11}$ 115a to the data object 206a, and deletes the second student data object.

In the sixth example 275, consider that the first changeset $C_{11}$ 115a and the third changeset $C_{21}$ 125b correspond to a "LinkList insert" operation on the data object 206a and 206b, respectively, such as inserting a list item to a linked list (data object). The first changeset $C_{11}$ 115a corresponds to inserting a list item "A" to a tail of a linked list data object having n list items, and the third changeset $C_{21}$ 125b corresponds to inserting a list item "B" to the tail of the linked list data object. In some embodiments, if both the changesets are inserting a list item to a linked list data object, then the merging rules define that the order in which the list items are inserted depends on the timestamps of the corresponding changesets.

Accordingly, since the timestamp, to of the first changeset $C_{11}$ 115a is earlier than the timestamp, $t_1$, of the third changeset $C_{21}$ 125b (as indicated in the example 235 of FIG. 2C), the first client device 110 determines that the first changeset $C_{11}$ 115a is to be applied first and then the third changeset $C_{21}$ 125b as a result of the merge operation 160a. Accordingly, the first client device 110 inserts the list item "A" to the tail of the linked list first and then inserts the list item "B" to the tail of the linked list by applying the first changeset $C_{11}$ 115a and the third changeset $C_{21}$ 125b to the data object 206a in the order of their timestamps.

In the seventh example 280, consider that the first changeset $C_{11}$ 115a to a "delete object" operation on the data object 206a, such as deleting a car data object, and that the third changeset $C_{21}$ 125b corresponds to any update operation on the data object 206b, such as updating a color attribute of the car data object. In some embodiments, if one of the changesets corresponds to deleting a data object and the other corresponds to updating the data object, then the merging rules define that the delete operation wins and the other changeset is to be discarded as a result of the merge operation 160a. Accordingly, the first client device 110 deletes the car data object by applying the first changeset $C_{11}$ 115a to the data object 206a.

Similar to the above seventh example, if one changeset corresponds to "clear content" operation on a database table and the other changeset corresponds to updating contents of the database table, the merging rules define that the "clear content" operation wins and the other changeset is to be discarded as a result of the merge operation 160a.

In the eight example 285, consider that the first changeset $C_{11}$ 115a corresponds to an "increment counter" (or "decrement counter") operation on the data object 206a, such as incrementing (or decrementing) a value of a valves attribute of a car data object, which has a value of "4," and that the third changeset $C_{21}$ 125b also corresponds to an "increment counter" (or "decrement counter") operation on the valves attribute of the car data object. In some embodiments, if both the changesets correspond to an "increment counter" (or "decrement counter") operation, then the merging rules define that both the changesets are to be applied. Accordingly, the first client device 110 increments the value of the valves of the car to "6" by applying both first changeset $C_{11}$ 115a and the third changeset $C_{21}$ 125b to the data object 206a as part of the merge operation 160a.

The above operations are just example operations used to describe how a conflict is resolved between two operations. The merge operation is not limited to resolving conflicts for the above operations, and can resolve conflicts various other operations based on the above techniques. Further, the above examples are described with respect to resolving conflict at the first client device 110. However, the merge operation can resolve the conflicts at the second client device 115 similar to the merge operation described with reference to the first client device 110. For example, like the first client device 110 downloads the third changeset 125b and the fourth changeset 126b of the second client device 115 from the server 105, the second client device 115 can download the first changeset 115b and the second changeset 116b of the first client device 110 from the server 105 and merge them with its local changesets based on the type of operations and timestamps, as described above with respect to the first client device 110.

Further, the above examples describe resolving any potential conflicts between the first changeset $C_{11}$ 115a and the third changeset $C_{21}$ 125b. However, any potential conflicts with the remaining changesets—the fourth changeset $C_{22}$ 126b and the second changeset $C_{12}$ 116a—can also be similarly resolved.

Figure 3:
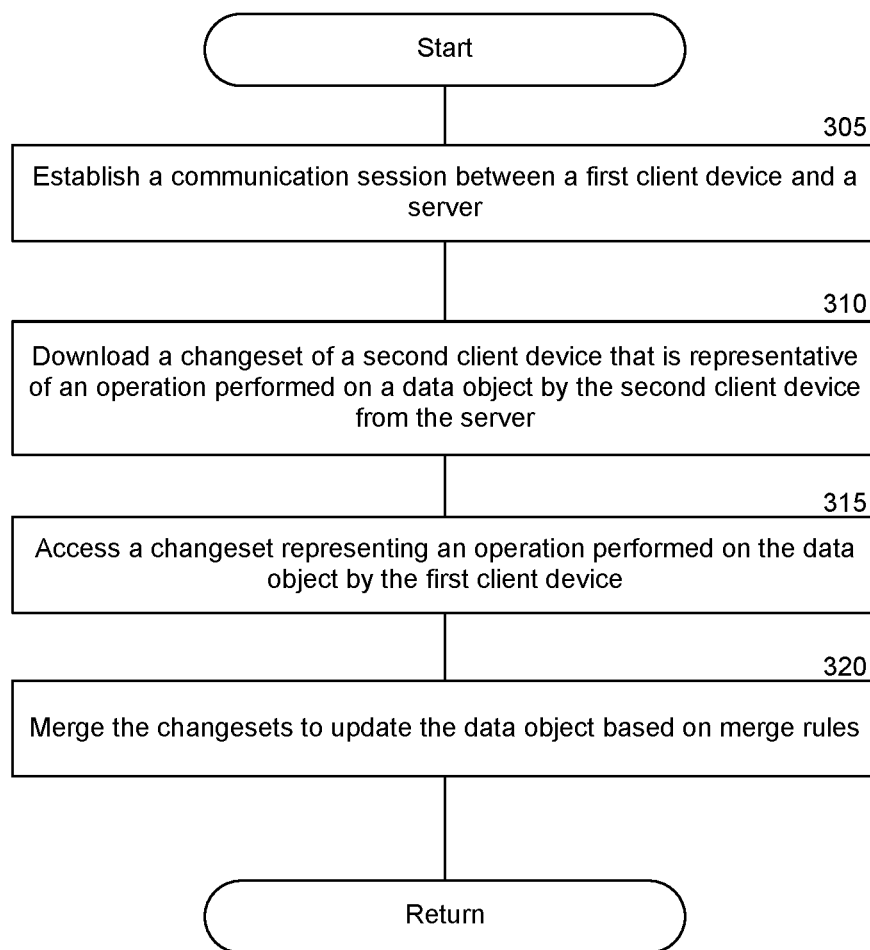
FIG. 3 is a flow diagram of a process for synchronizing data between multiple client devices, consistent with various embodiments.

FIG. 3 is a flow diagram of a process 300 for synchronizing data between multiple client devices, consistent with various embodiments. In some embodiments, the process 300 can be implemented in the environment 100. At block 305, the first client device 110 establishes a communication session between the first client device 110 and the server 105. In some embodiments, the first client device 110 can send a synchronization request, such as the synchronization request 226 of FIG. 2B, to the server 105 when the communication session is established. The first client device 110 can also send information such as a client identification (ID) that uniquely identifies the first client device 110, the server checkpoint, and the client checkpoint associated with the first client device 110 to the server 105 (e.g., as part of the synchronization request), which can be used for synchronizing the data at the first client device 110.

At block 310, the first client device 110 downloads a remote changeset, e.g., a changeset of another client device that is representative of an operation performed on a data object by the other client device, from the server 105. For example, the first client device 110 downloads the third changeset 125b and the fourth changeset 126b from the server 105, which represent operations performed by the second client device 115 on the data object 206b stored at the second client device 115.

At block 315, the first client device 110 accesses a local changeset, e.g., a changeset representing an operation performed on the data object by the first client device 110. For example, the first client device 110 accesses the first changeset 115a and the second changeset 116a that represent operations performed on the data object 206a stored at the first client device 110. The first client device 110 can generate a changeset in response to an operation performed on the data object, e.g., by the user 111, that changes a state (e.g., a value) of the data object. The first changeset 115a and the second changeset 116a may be generated in response to a first operation and a second operation on the data object 206a, respectively. In some embodiments, the data object 206 is shared between the multiple client devices and each of the multiple client devices can store a copy of the data object locally (e.g., at the client device). Accordingly, any changes made to the data object in one client device may have to be applied to the data object stored in the other client devices for the data object to be consistent across the multiple client devices.

At block 320, the first client device 110 merges the local changesets and the remote changesets based on the merging rules to update the data object 206a at the first client device 110. For example, the first client device 110 merges the first changeset 115a, second changeset 116a, third changeset 125b and fourth changeset 126b based on the merging rules and updates the data object 206a, e.g., as described at least with reference to FIGS. 2A-2D. The process 300 resolves any potential conflict that can arise in applying the changesets to the data object 206a based on the merging rules, which are defined as a function of the type of operations in each of the changesets and a timestamp associated with each of the changesets.

In some embodiments, the process 300 is performed as part of the synchronization process 165a of FIG. 1 and the merge operation 160a.

Figure 4:
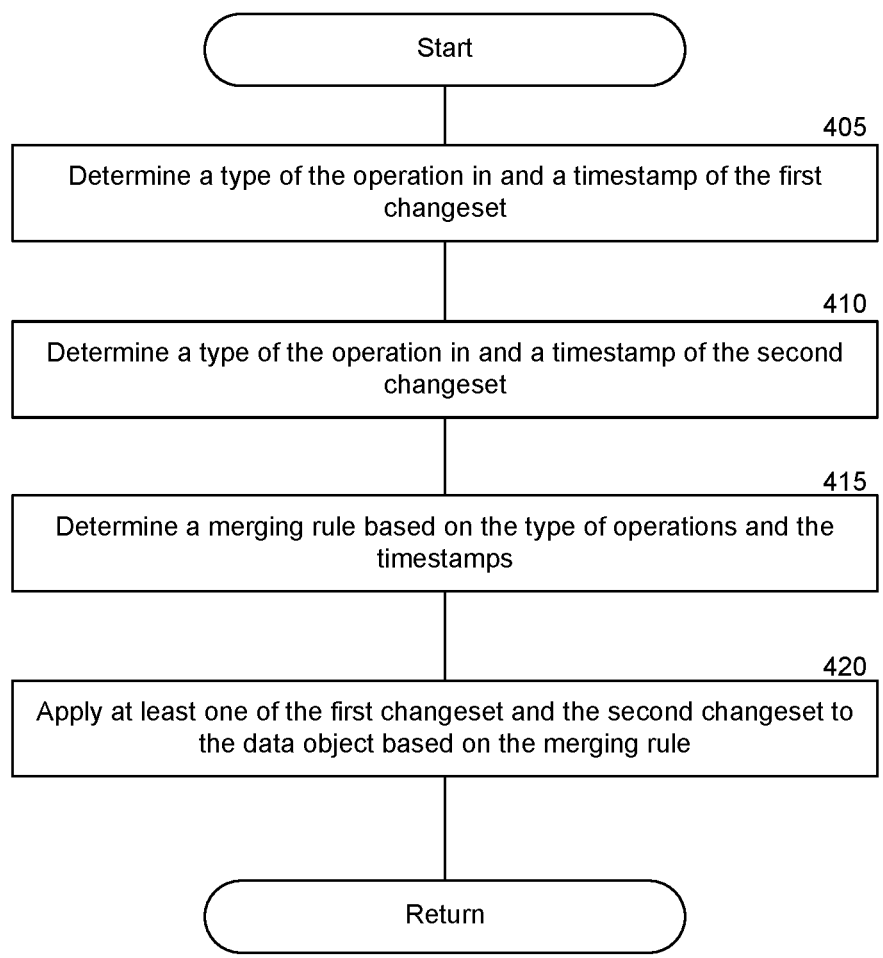
FIG. 4 is a flow diagram of a process for determining a merging rule to resolve conflict between two changesets, consistent with various embodiments.

FIG. 4 is a flow diagram of a process 400 for determining a merging rule to resolve conflict between two changesets, consistent with various embodiments. In some embodiments, the process 400 can be implemented in the environment 100 of FIG. 1 and as part of the merge operation 160a. In some embodiments, the process 400 can be implemented as part of block 320 of FIG. 3. At block 305, the first client device 110 determines a type of operation in the local changeset and a timestamp of the local changeset. For example, the first client device 110 determines the type of operation in the first changeset 115a and a timestamp associated with the first changeset 115a, which is indicative of the time at which the first changeset 115a was generated at the first client device 110.

At block 410, the first client device 110 determines a type of operation in the remote changeset and a timestamp of the remote changeset. For example, the first client device 110 determines the type of operation in the third changeset 125b and a timestamp associated with the third changeset 125b, which is indicative of the time at which the third changeset 125b was generated at the second client device 115.

At block 415, the first client device 110 determines the merging rules based on the type of operations in and the timestamps of the local and remote changesets. For example, as described at least with reference to FIG. 2C, if the first changeset $C_{11}$ 115a represents a "set property" operation and the third changeset 125b also represents a "set property" operation on the data object 206, then the first client device 110 identifies a merging which states that if the type of operation in both the changesets represent a "set property"

operation, the changeset that has a later timestamp emerges as a winner in the merge operation.

In some embodiments, the merging rules can be stored in a rule log or a rule lookup table, and a merging rule can be determined by looking up the lookup table based on the type of operations. The merging rules can be maintained at the server 105 and each of the client devices can have a copy of the merging rules.

At block 420, the first client device 110 applies at least one of the local changeset or remote changeset to the data object 206a at the first client device 110 based on the merging rule that is determined in block 420. Continuing with example described in block 415, the first client device 110 applies the "set property" operation of the first changeset $C_{11}$ 115a or the third changeset 125b that has a later timestamp to the data object 206a and updates the data object 206a accordingly.

Figure 5:
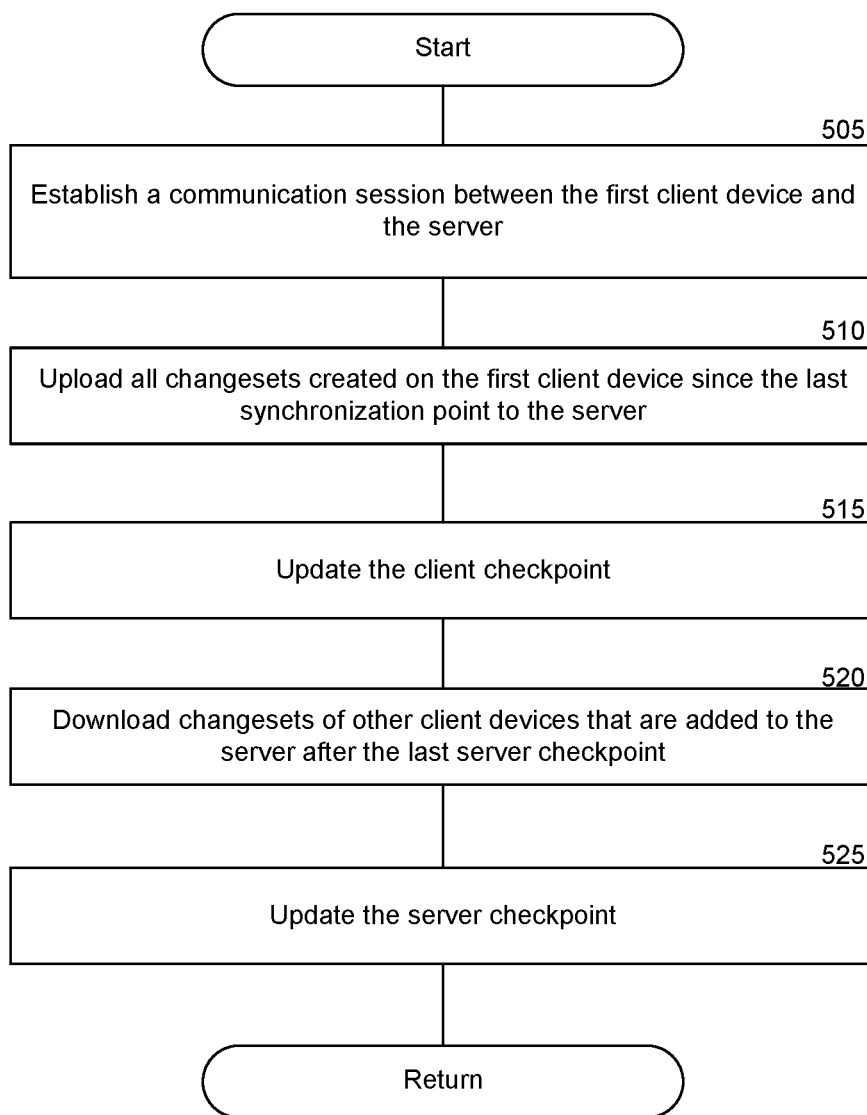
FIG. 5 is a flow diagram of a process for uploading changesets from and downloading changesets to a client device, consistent with various embodiments.

FIG. 5 is a flow diagram of a process 500 for uploading changesets from and downloading changesets to a client device from the server of FIG. 1, consistent with various embodiments. In some embodiments, the process 500 can be implemented in the environment 100 of FIG. 1. In some embodiments, the process 500 can be implemented as part of the synchronization process 165a of FIG. 1. At block 505, the first client device 110 establishes a communication session between the first client device 110 and the server 105. In some embodiments, the first client device 110 can send a synchronization request, such as the synchronization request 226 of FIG. 2B, to the server 105 when the communication session is established. The first client device 110 can also send information such as a client ID of the first client device 110, the server checkpoint, and the client checkpoint associated with the first client device 110 to the server 105.

At block 510, the first client device 110 uploads local changesets, e.g., changesets generated at the first client device 110, to the server 105. For example, after the first client device 110 uploads the first changeset 115a and the second changeset 116a to the server 105.

At block 515, the first client device 110 inserts a checkpoint in the transaction log ("client checkpoint") of the first client device 110 to indicate the last uploaded changeset. The first client device 110 uploads only the unsynchronized changesets to the server 105, that is, the changesets that are not already uploaded to the server 105. Whenever the first client device 110 synchronizes with the server 105, the first client device 110 ensures that only those local changesets that are added to the client transaction log after the last client checkpoint is added are uploaded to the server 105. For example, after the first client device 110 uploads the first changeset 115a and the second changeset 116a to the server 105 as illustrated in FIG. 2B, the first client device 110 can add a client checkpoint 170 in the client transaction log 155a at the second changeset 116a. When the first client device 110 synchronizes with the server 105 next time, only those changesets that are added to the client transaction log 155a after the client checkpoint 170 are uploaded to the server 105.

At block 520, the first client device 110 downloads remote changesets, e.g., a changeset of another client device that is representative of an operation performed on a data object by the other client device, from the server 105. For example, the first client device 110 downloads the third changeset 125b and the fourth changeset 126b from the server 105, which represent operations performed by the second client device 115 on the data object 206b.

At block 525, the first client device 110 inserts a checkpoint in the transaction log ("server checkpoint") of the server 105 to indicate the last downloaded changeset in the communication session. The first client device 110 downloads only the unsynchronized changesets from the server 105, that is, the changesets that are not already downloaded from the server 105. Whenever the first client device 110 synchronizes with the server 105, the first client device 110 ensures that only those remote changesets that are added to the server transaction log after the last server checkpoint is added are downloaded from the server 105. For example, after the first client device 110 downloads the third changeset 125b and the fourth changeset 126b from the server 105 as illustrated in FIG. 2B, the first client device 110 can insert a server checkpoint 175 in the server transaction log 150 at the fourth changeset 126b. When the first client device 110 synchronizes with the server 105 next time, only those changesets that are added to the server transaction log 150 after the server checkpoint 175 are downloaded from the server 105.

Note that the processes 300-500 of FIGS. 3-5 are described with reference to the first client device 110. These processes can also be executed at other client devices, e.g., the second client device 115, to synchronize the data at those client devices.

Figure 6:
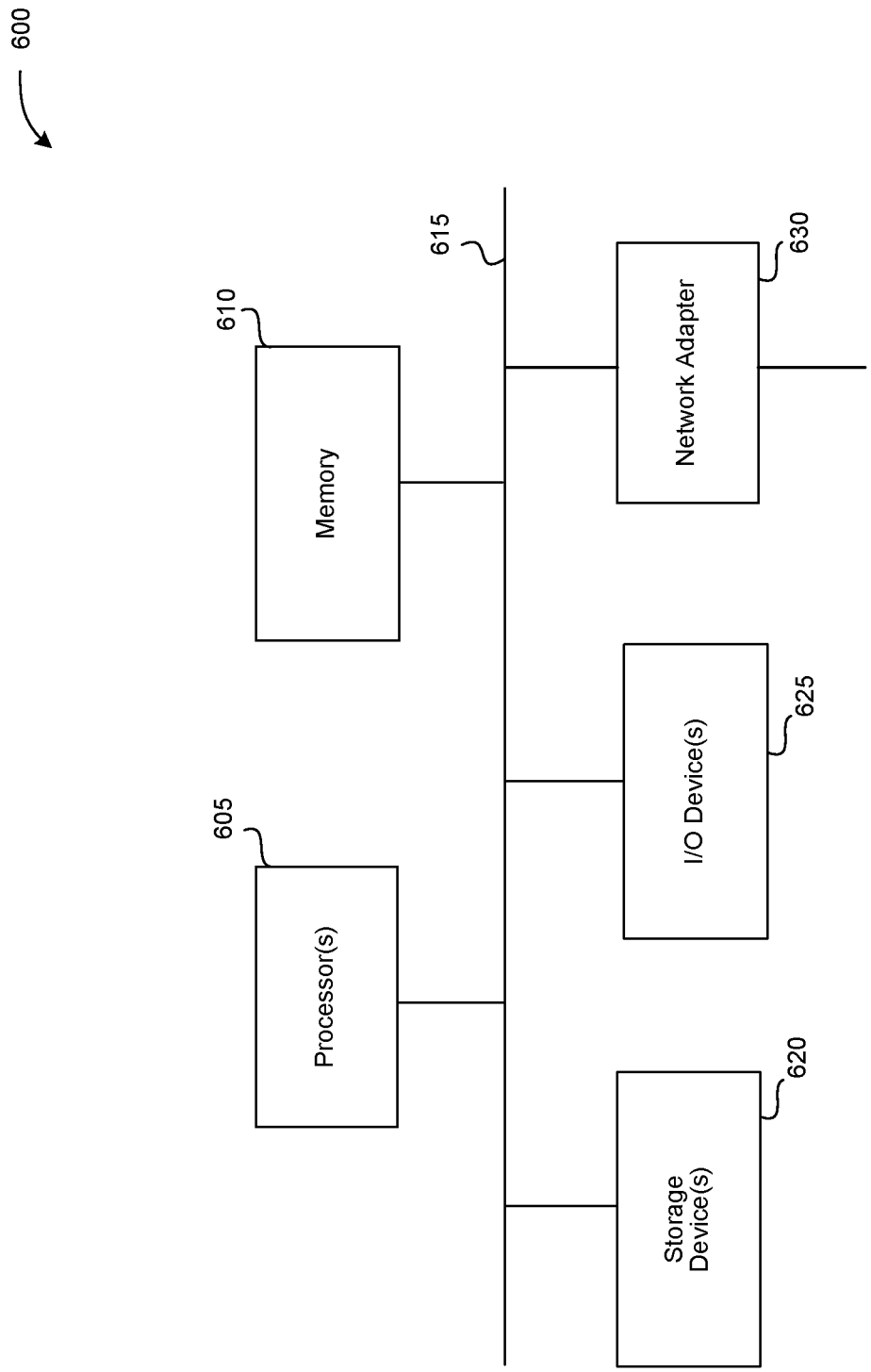
FIG. 6 is a block diagram of a processing system that can implement operations of the disclosed embodiments.

FIG. 6 is a block diagram of a computer system as may be used to implement features of the disclosed embodiments. The computer system 600 may be used to implement any of the entities, components, modules, processes, or services depicted in the examples of the foregoing figures (and any other entities described in this specification). The computer system 600 may include one or more central processing units ("processors") 605, memory 610, input/output devices 625 (e.g., keyboard and pointing devices, display devices), storage devices 620 (e.g., disk drives), and network adapters 630 (e.g., network interfaces) that are connected to an interconnect 615. The interconnect 615 is illustrated as an abstraction that represents any one or more separate physical buses, point to point connections, or both connected by appropriate bridges, adapters, or controllers. The interconnect 615, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 610 and storage devices 620 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 610 can be implemented as software and/or firmware to program the processor(s) 605 to carry out actions described above. In some embodiments, such software or firmware may be initially provided to the computer system 600 by downloading it from a remote system through the computer system 600 (e.g., via network adapter 630).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

I claim:

1. A method, comprising:
    accessing, at a first client device, a first changeset that is representative of an operation performed on a data object in a database by the first client device;
    transmitting, from the first client device and to a server, a synchronization request for synchronizing the database with one or more changesets generated by a second client device;
    receiving, at the first client device and from the server in response to synchronization request, a second changeset that is representative of an operation performed by the second client device on the data object, wherein the data object is shared between the first client device and the second client device, wherein receiving the second changeset includes:
        transmitting, by the first client device and to the server, a request to add a server checkpoint in a transaction log of the server after the second changeset has been downloaded by the first client device, wherein the server checkpoint indicates a position in the transaction log up to which changesets of other client devices are downloaded by the first client device; and
    merging, at the first client device, the first changeset and the second changeset to update the data object, wherein the merging is performed based one or more rules that are specific to a type of the operation in the first changeset and the second changeset.

2. The method of claim 1, wherein the accessing the first changeset further includes:
    generating, at the first client device, the first changeset in response to an operation performed on the data object that changes a state of the data object, and
    transmitting, by the first client device, the first changeset to the server for updating the data object at the second client device.

3. The method of claim 2 further comprising:
    generating, by the first client device, a client checkpoint in a transaction log at the first client device after transmitting the first changeset and merging the second changeset with the first changeset, wherein the client checkpoint indicates a point in the transaction log up to which the database is synchronized with the server.

4. The method of claim 3 further comprising:
    receiving, by the first client device and from the server, a third changeset that is representative of an operation performed by the second client device on the data object,
    determining, by the first client device, a state of the data object at the client checkpoint, and
    applying the third changeset to the state of the data object to update the data object.

5. The method of claim 1, wherein transmitting the synchronization request includes:
    transmitting, by the first client device and to the server, information regarding the server checkpoint to the server, and
    receiving, from the server, one or more changesets added to the transaction log of the server after the server checkpoint, the one or more changesets added to the transaction log of the server by the second client device.

6. The method of claim 1, wherein the first changeset is associated with a first timestamp that is indicative of when the data object is updated at the first client device, and wherein the second changeset is associated with a second timestamp that is indicative of when the data object is updated at the second client device.

7. The method of claim 6, wherein merging the first changeset and the second changeset at the first client device includes:
   determining that the first changeset corresponds to setting an attribute of the data object and that the second changeset corresponds to setting the attribute of the data object,
   selecting a specified changeset that has a later timestamp between the first timestamp and the second timestamp, and
   applying the specified changeset to the data object to set the attribute.

8. The method of claim 6, wherein merging the first changeset and the second changeset at the first client device includes:
   determining that the first changeset corresponds to setting a default value of an attribute of the data object to a first value and that the second changeset corresponds to setting the attribute of the data object to a second value, and
   applying none of the first changeset and the second changeset, or one of the first changeset or the second changeset to the data object based on the first value and the second value.

9. The method of claim 8, wherein the applying includes:
   determining that the first value and the second value are the same, and
   discarding both the first changeset and the second changeset.

10. The method of claim 8, wherein the applying includes:
    determining that the first value and the second value are different,
    selecting a specified changeset that has a later timestamp between the first timestamp and the second timestamp, and
    applying the specified changeset to the data object to set the default value.

11. The method of claim 6, wherein merging the first changeset and the second changeset at the first client device includes:
    determining that the first changeset corresponds to adding a first integer value to an attribute of the data object and that the second changeset corresponds to setting the attribute of the data object to a second integer value,
    in an event the first timestamp is earlier than the second timestamp, discarding the first changeset and applying the second changeset to set the attribute of the data object to the second integer value, and
    in an event the first timestamp is later than the second timestamp, applying the second changeset to set the attribute of the data object to the second integer value and applying the first changeset to add the first integer value to the second integer value.

12. The method of claim 6, wherein merging the first changeset and the second changeset at the first client device includes:
    determining that the first changeset corresponds to setting a specified value of an attribute of the first copy of the data object as a primary key and that the second changeset corresponds to setting the specified value of an attribute of a copy of another data object as the primary key,
    in an event the first timestamp is earlier than the second timestamp, applying the first changeset to set the attribute of the data object as the primary key and discarding the second changeset.

13. The method of claim 6, wherein merging the first changeset and the second changeset at the first client device includes:
    determining that the first changeset corresponds to inserting a first list item in a linked list associated with the data object and that the second changeset corresponds to inserting a second list item in a linked list associated with the data object, and
    applying the first changeset and the second changeset to insert the first list item and the second list item in the linked list associated with the data object in an order of the timestamps of the first changeset and the second changeset.

14. The method of claim 1, wherein merging the first changeset and the second changeset at the first client device includes:
    determining that an attribute of the data object is a first string,
    determining that the first changeset corresponds to an operation on a portion of the first string and that the second changeset corresponds to setting the attribute to a second string, and
    discarding the first changeset and applying the second changeset to set the attribute of the data object to the second string.

15. The method of claim 1, wherein merging the first changeset and the second changeset at the first client device includes:
    determining that the first changeset corresponds to deleting the data object and that the second changeset corresponds to updating an attribute of the data object,
    applying the first changeset to delete the data object, and
    discarding the second changeset.

16. The method of claim 1, wherein merging the first changeset and the second changeset at the client device includes:
    determining that the data object is a database table,
    determining that the first changeset corresponds to clearing contents of the database table and that the second changeset corresponds to updating content of the database table,
    applying the first changeset to clear the contents of the database table, and
    discarding the second changeset.

17. A non-transitory computer-readable storage medium storing computer-readable instructions, comprising:
    instructions for generating, at a first client device, a first changeset that is representative of an operation on a data object in a database;
    instructions for transmitting, from the first client device and to a server, a synchronization request for synchronizing the database with one or more changesets generated by a second client device;
    instructions for receiving, at the first client device and from the server in response to synchronization request, a second changeset that is representative of an operation performed by the second client device on the data object, wherein the database is shared between the first client device and the second client device, wherein receiving the second changeset includes:

transmitting, by the first client device and to the server, a request to add a server checkpoint in a transaction log of the server after the second changeset has been downloaded by the first client device, wherein the server checkpoint indicates a position in the transaction log up to which changesets of other client devices are downloaded by the first client device; and instructions for merging, at the first client device, the first changeset and the second changeset to update the data object, wherein the merging is performed based one or more rules that are specific to a type of the operation in the first changeset and the second changeset.

18. The computer-readable storage medium of claim 17 further comprising:

instructions for transmitting, by the first client device, the first changeset to the server for updating the database at the second client device.

19. The computer-readable storage medium of claim 17, wherein the first changeset is associated with a first timestamp that is indicative of when the data object is updated at the first client device, and wherein the second changeset is associated with a second timestamp that is indicative of when the data object is updated at the second client device and wherein the instructions for merging the first changeset and the second changeset at the first client device include:

instructions for determining that the first changeset corresponds to setting an attribute of the data object and that the second changeset corresponds to setting the attribute of the data object, instructions for selecting a specified changeset that has a later timestamp between the first timestamp and the second timestamp, and instructions for applying the specified changeset to the data object to set the attribute.

20. The computer-readable storage medium of claim 17, wherein the instructions for merging the first changeset and the second changeset at the first client device include:

instructions for determining that the first changeset corresponds to incrementing an attribute value of the data object by a first specified value and that the second changeset corresponds to incrementing the attribute value of the data object by a second specified value, and instructions for applying the first changeset and the second changeset to the data object to increment the attribute value by the first specified value and the second specified value.

21. The computer-readable storage medium of claim 17 further comprising:

instructions for receiving, at the first client device, multiple changesets from the server, the multiple changesets including (a) a first set of changesets that is associated with operations on the data object and (b) a second set of changesets that is associated with operations on another data object in the database that is not related to the data object.

22. The computer-readable storage medium of claim 21 further comprising:

instructions for applying, at the first client device, the second set of changesets to the other data object regardless of the first set of changesets that is associated with operations on the data object.

23. A system, comprising:

a processor;

a memory storing instructions which, when executed by the processor, perform the method of:

receiving, at a first client device, a user input to update a data object in a database, the user input including an operation to be performed on the data object, generating, at the first client device, a first changeset that is representative of the operation, receiving, at the first client device and from a server, a second changeset that is representative of an operation performed on the data object by a second client device, wherein the database is shared between the first client device and the second client device, wherein receiving the second changeset includes:

transmitting, by the first client device and to the server, a request to add a server checkpoint in a transaction log of the server after the second changeset has been downloaded by the first client device, wherein the server checkpoint indicates a position in the transaction log up to which changesets of other client devices are downloaded by the first client device, and merging, at the first client device, the first changeset and the second changeset to update the data object, wherein the merging is performed based one or more rules that are specific to a type of the operation in the first changeset and the second changeset.

24. The system of claim 23, wherein the memory further comprises instructions for:

transmitting, by the first client device, the first changeset to the server for updating the database at the second client device.

* * * * *